United States Patent Office 3,371,119
Patented Feb. 27, 1968

3,371,119
PROCESS FOR THE PREPARATION OF
2,4-DIHYDROXYBENZOPHENONE
Myron S. Whelen, Wilmington, Del., assignor to E. I. du Pont de Nemours and Company, Wilmington, Del., a corporation of Delaware
No Drawing. Filed Dec. 2, 1965, Ser. No. 511,246
5 Claims. (Cl. 260—591)

This invention relates to an improved process for the preparation of 2,4-dihydroxybenzophenone.

2,4-dihydroxybenzophenone is widely used as an ultraviolet light absorber in resinous and polymeric compositions, such as polystyrene, acrylonitrile polymers and polymers and copolymers of acrylates and methacrylates. It may also be used as an intermediate in the preparation of other ultraviolet light absorbers, e.g., various ether derivatives thereof, as described in United States Patent 3,006,959.

A method customarily used for the preparation of 2,4-dihydroxybenzophenone is one of the Friedel-Crafts type wherein benzoyl chloride is reacted with resorcinol in the presence of aluminum chloride. This method is economically undesirable because of the large amounts of aluminum chloride required and because yields higher than 75% of theory cannot be obtained.

Another method by which 2,4-dihydroxybenzophenone may be produced is commonly referred to as the Hoesch reaction. This reaction is thoroughly discussed by Spoerri and Du Bois in Organic Reactions, John Wiley & Sons, Inc. (New York, 1949), volume 5, chapter 9. This process is usually carried out by saturating a mixture of equimolar quantities of resorcinol and benzonitrile with hydrogen chloride gas in the presence of zinc chloride and dry ether. After the reaction is complete, water is added to the mixture to hydrolyze the resulting reaction product to 2,4-dihydroxybenzophenone. This process is commerically undesirable primarily because of safety factors involved in the use of ether and because yields of ketone greater than 40% cannot be obtained. The use of solvents other than ether, e.g., glacial acetic acid, chloroform-ether, methyl acetate and ethyl bromide, gives even lesser yields.

Therefore, it is the primary object of this invention to provide a commercially economical process for producing 2,4-dihydroxybenzophenone of high purity in substantially higher yields than heretofore possible. It is a further object of this invention to provide a commercially economical process for producing 2,4-dihydroxybenzophenone requiring no solvent for the reaction mixture. Other objects will become apparent from the following description and claims.

These objects may be accomplished by the process of this invention wherein resorcinol is reacted with at least about two moles of benzonitrile per mole of resorcinol in the presence of zinc chloride and hydrogen chloride followed by hydrolysis of the resulting reaction product to 2,4-dihydroxybenzophenone. The 2,4-dihydroxybenzophenone isolated from the reaction mixture, preferably by filtration, is of high purity and is obtained in yields greater than 90% of theory based on the resorcinol. The process of this invention does not require the presence of ether or any other solvent or diluent.

More particularly, in the process of this invention hydrogen chloride gas is added, preferably with agitation, to a mixture of resorcinol, at least about two moles of benzonitrile per mole of resorcinol, and zinc chloride, preferably in a closed vessel, until the mixture is saturated with hydrogen chloride or until about 1.6 to 2.0 moles of hydrogen chloride per mole of resorcinol have been absorbed. The hydrogen chloride may be introduced above or below the surface of the mixture. The pressure within the vessel is not critical and may increase within convenient limits dictated by the equipment being utilized.

During the addition of hydrogen chloride, the temperature of the mixture is preferably maintained within the range of from about 10° C. to about 85° C. It is preferred that the mixture be at a temperature of about 25° C. when the hydrogen chloride addition is started because at lower temperatures the mixture is viscous and difficult to stir. At temperatures above 85° C. yields tend to decrease. Cooling is usually necessary to maintain the temperature below 85° C.

After the addition of hydrogen chloride is completed, the reaction vessel is vented and the mixture is stirred until copious evolution of hydrogen chloride ceases, usually for a period of not more than 10 hours, preferably while the temperature is maintained within the range of from about 10° C. to about 85° C., most preferably about 50° C. The hydrogen chloride evolved during this period is vented off.

The resulting reaction product is then hydrolyzed to 2,4-dihydrobenzophenone. Hydrolysis may be most economically effected by adding water to the reaction mixture and stirring the mixture for several hours. Until this hydrolysis step the reaction mixture should obviously be maintained free of moisture.

After any volatile materials remaining in the mixture have been removed, preferably by steam distillation, the mixture is cooled and filtered. The 2,4-dihydroxybenzophenone obtained is washed with water and dried.

The amount of benzonitrile utilized in the process of this invention is at least about two moles per mole of resorcinol. About two moles are sufficient to give maximum yields and the use thereof is therefore preferred. An excess over two moles may be utilized as a diluent if difficulty arises in stirring of the reaction mixture. The use of more than four moles per mole of resorcinol is usually unnecessary and wasteful.

About 0.3 to 1 mole of zinc chloride per mole of resorcinol is sufficient and therefore preferred. Other catalysts, e.g., aluminum chloride, ferric chloride, stannic chloride and stannous chloride, may be utilized in lieu of zinc chloride, however, somewhat lesser yields are obtained.

The process of this invention is further illustrated though not limited by the following example in which all parts are by weight.

Example 165 parts (1.5 moles) of resorcinol and 120 parts (0.74 mole) of anhydrous zinc chloride are added to 309 parts (3.0 moles) of benzonitrile and the whole is agitated at about 25° to 30° C. for ½ hour. Hydrogen chloride gas is then added over a period of several hours until the reaction mixture is saturated or unitil a total of about 95 to 109 parts (2.6 to 3.0 moles) has been absorbed. The reaction mass is maintained at 50° C. for 8 hours, during which time evolved hydrogen chloride is allowed to escape. Thereafter, 800 parts of cold water are gradually added and the reaction mass is agitated at ambient temperatures for several hours. The reaction mass is then subjected to steam distillation to remove any volatile products present. The resulting mixture is cooled and filtered to isolate the 2,4-dihydroxybenzophenone which is subsequently washed with water and dried. 300 parts of 2,4-dihydroxybenzophenone are obtained (93.3% yield based on the resorcinol), having a melting point of 143° to 144° C. and purity of 97%.

As many apparently widely different embodiments of this invention may be made without departing from the spirit and scope thereof, it is to be understood that this invention is not limited to the specific embodiments thereof except as defined in the appended claims.

What is claimed is:

1. A process for preparing 2,4-dihydroxybenzophenone comprising reacting resorcinol with at least about two moles of benzonitrile per mole of resorcinol in the presence of zinc chloride and hydrogen chloride and thereafter, hydrolyzing the resulting reaction product to 2,4-dihydroxybenzophenone.

2. The process of claim 1 wherein the reaction of resorcinol and benzonitrile is carried out at a temperature within the range of from about 10° C. to about 85° C.

3. A process for preparing 2,4-dihydroxybenzophenone comprising, saturating a mixture comprising resorcinol, at least about two moles of benzonitrile per mole of resorcinol and at least about 0.3 mole of zinc chloride per mole of resorcinol with hydrogen chloride gas while maintaining said mixture at a temperature within the range of from about 10° C. to about 85° C.; maintaining the resulting mixture at a temperature within said range until copious evolution of hydrogen chloride gas has substantially ceased; treating the resulting mixture to hydrolyze the reaction product contained therein to 2,4-dihydroxybenzophenone; and thereafter isolating from the resulting mixture said 2,4-dihydroxybenzophenone.

4. The process of claim 3 wherein said reaction product is hydrolyzed to 2,4-dihydroxybenzophenone by adding water to the mixture containing said reaction product.

5. The process of claim 3 wherein said temperatures are about 50° C.

References Cited
UNITED STATES PATENTS 2,177,720   5/1938   Hopff et al. _____ 260—591

OTHER REFERENCES

Adams et al., Organic Reactions, vol. V, pages 387–402 (1949), John Wiley & Sons, New York, N.Y.

DANIEL D. HORWITZ, *Primary Examiner.*